Sept. 22, 1953 A. H. LAMB 2,652,725
BIMETALLIC THERMOMETER MOUNTING FOR DOUBLE-WALLED TANKS
Filed June 3, 1949
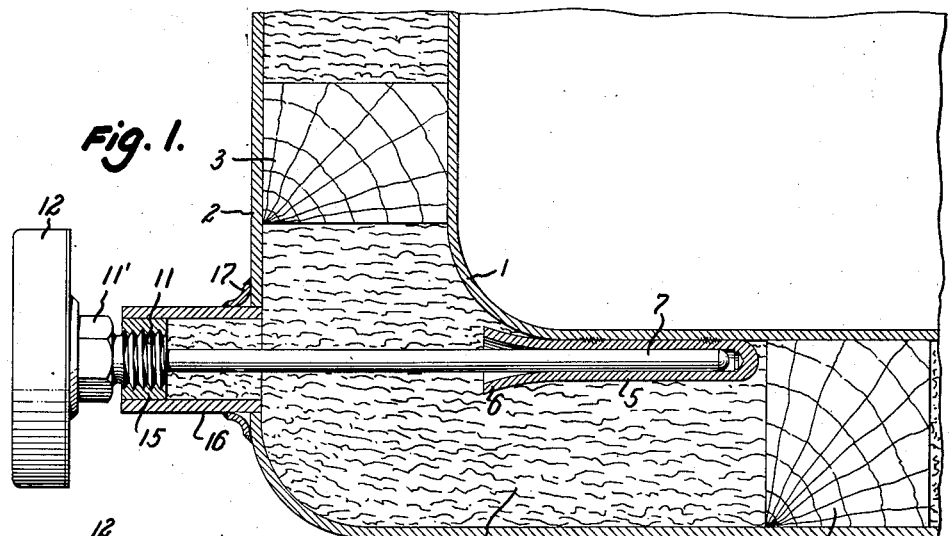
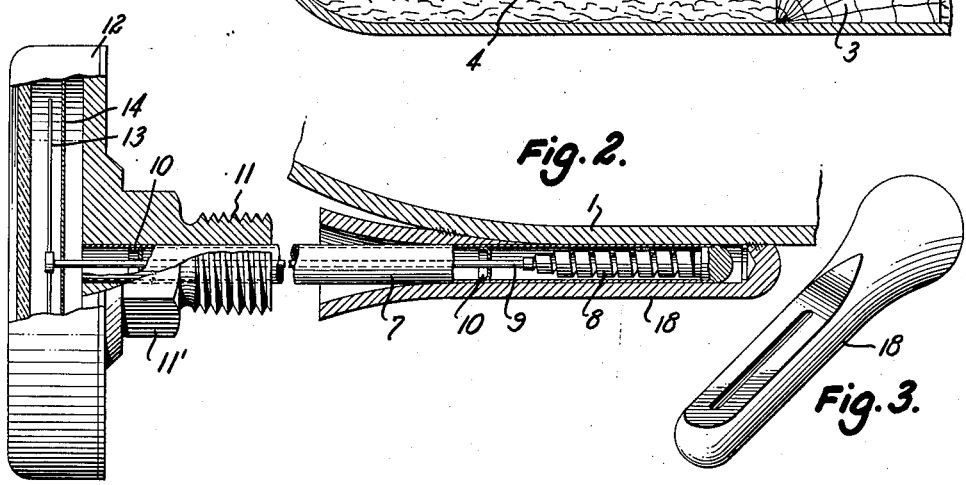
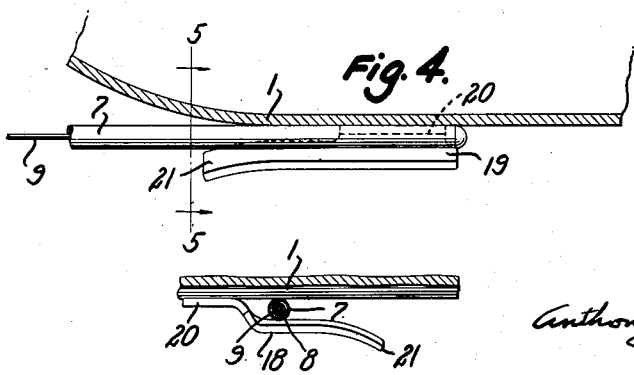
Inventor:
Anthony H. Lamb,
By Pierce, Scheffler & Parker,
Attorneys.

Patented Sept. 22, 1953

2,652,725

UNITED STATES PATENT OFFICE 2,652,725

BIMETALLIC THERMOMETER MOUNTING
FOR DOUBLE-WALLED TANKS

Anthony H. Lamb, Hillside, N. J., assignor to
Weston Electrical Instrument Corporation,
Newark, N. J., a corporation of New Jersey Application June 3, 1949, Serial No. 97,034

6 Claims. (Cl. 73—343)

This invention relates to bimetallic thermometer mountings for double-walled tanks, and more particularly to mountings or assemblies by which a thermometer dial at the exterior of a double tank or double-walled tank indicates the temperature of the outer surface of the inner tank.

The invention is not yet limited to but is particularly useful in the dairy industry since it affords accurate measurements of the temperature of milk in double-walled storage tanks without cutting the inner tank wall or interrupting the continuity of its smooth highly polished surface. The current practice in dairies and milk-processing plants is to store the milk in large double-walled tanks; the milk being cooled by circulation through coolers external to the tank, and the space between the tank walls being filled with heat-insulating material to reduce heat transfer to the milk. The inner tank or milk storage container is supported within the outer tank or jacket by solid wood blocks strategically spaced about the inner tank, and the intervening spaces between the two tanks are filled with insulating material such as glass wool, rock wool or cork.

The State and Federal sanitation regulations for the handling of milk require that the tank surface contacted by the milk be smooth, free from cracks or recesses, and highly polished; and that the tanks be sterilized with steam once in each twenty-four hours. A further requirement is that the milk be maintained at a temperature below 50° F., but above 32° F., during storage in tanks. An inspector can condemn the milk as unfit for human consumption if he finds that the temperature is above 50° F., and this constitutes a substantial loss to the operator as some of the tanks hold hundreds of gallons of milk. The practice has been to cool the milk to well below 50° F., as indicated by the prior mercury or other expansible liquid thermometers, as a factor of safety to insure that the milk temperature as indicated by the inspector's thermometer will be below 50° F.

In general, the prior temperature measuring equipment has included a relatively heavy metal tube passing through both walls of the tank and with a closed inner end projecting into the interior of the inner tank, and an expansible liquid thermometer with a bulb within the inner end of the tube and a graduated scale outside of the tank. Such measuring systems are open to several objections. The extension of the metal tube into the interior of the inner tank results in a "blind spot" below and along the lower surface of the tube which is difficult to inspect for thorough cleaning from an opening in the top wall of the tank.

Objects of the present invention are to provide tank and thermometer assemblies which are free from the objections which are characteristic of the prior practice. An object is to provide a bimetallic thermometer and mounting thereof on a double-walled tank for measuring the temperature of the outer surface of the inner tank. An object is to provide a bimetallic thermometer mounting for a double-walled tank which does not require a rigid connection of the tank walls to each other. More specifically, an object is to provide a thermometer assembly for a double-walled tank of the type stated, which assembly includes a bimetallic thermometer with a relatively long and somewhat flexible stem, a rigid support of the thermometer upon the outer wall or tank jacket, and a socket element on the tank for supporting the inner end of the thermometer stem.

These and other objects and the advantages of the invention will be apparent from the following specification when taken with the accompanying drawings in which:

Fig. 1 is a fragmentary vertical section through a double-walled tank and thermometer socket, and showing a thermometer in elevation;

Fig. 2 is a fragmentary vertical section, on a larger scale, illustrating a modified form of socket;

Fig. 3 is a perspective view of the thermometer socket of Fig. 2;

Fig. 4 is a fragmentary section of another tank and thermometer assembly as seen on a vertical plane parallel to and spaced from the axis of the thermometer; and Fig. 5 is a fragmentary vertical section on line 5—5 of Fig. 4.

In the drawings, the reference numeral 1 identifies the inner wall or milk storage tank which is supported by and spaced from an outer wall or tank jacket 2 by wood blocks 3 in conventional manner. Loose or non-rigid heat insulating material 4, for example cork, rock wool or glass wool, fills the inter-wall space which is not occupied by the spacing blocks to retard heat transfer to the inner tank. The inner surface of the tank 1 is highly polished and free from corners, recesses and irregularities.

In accordance with the invention, a thermometer socket 5, preferably of stainless steel, is welded to the outside of the bottom wall of the tank 1; the socket comprising a tube closed at its inner end and with its outer end 6 flaring outwardly to form a guide for the insertion of the stem 7 of a bimetallic thermometer.

As shown in section in Fig. 2, the thermometer includes a helical bimetallic element 8 within the inner end of the stem 7, and having its ends secured to the stem and to a staff 9, respectively. The staff 9 is loosely guided for rotation by ring bearings 10 which are welded to or otherwise secured to the stem. The staff extends through the threaded mounting head 11 and into the casing 12 where it carries a pointer 13 for cooperation with a graduated scale plate 14. The outer end of the stem 7 fits snugly within the bore of the mounting head 11 and is welded to it, and the outer end 11' of the mounting head is of hexagonal cross-section. The hollow stem 7 is of stainless steel and somewhat flexible, and the staff 9 is of small diameter and also flexible under transverse stresses.

Reverting to Fig. 1, an internally threaded plug or bushing 15 is welded into the outer end of a short cylinder 16 which is secured over an opening in the outer wall 2 by a collar 17 which is welded to the tube and to the wall 2. The thermometer stem 7 is of such length that it terminates close to the end of the socket 5 when the mounting head 11 is threaded into the bushing 15. The axis of the thermometer socket 5 is horizontal but the socket is not rigidly fixed with respect to the outer wall 2 since the inner wall or tank 1 is supported by the wood blocks 3 and is not rigidly secured to the outer wall 2. The bottom wall 1, the socket 5 and the inner end of the thermometer stem 7 thus may shift slightly with respect to the outer wall or jacket 2 on aging of the wood blocks. The axis of the threaded bushing 15 is horizontal and alined with the axis of the thermometer socket 5 when the thermometer assembly is first installed.

Accurate temperature indications are obtained in spite of small displacements of the inner tank since the staff 9 is relatively long and can bow or flex transversely when its opposite ends are not in exact axial alinement. The staff is loosely guided by the ring bearings 10, and there is little or no increase in the frictional resistance to angular movement of the staff 9 by the bimetallic element 8 within the range of possible mis-alinement of the ends of the thermometer.

The mass of the milk within the tank 1 is so great, as compared with the small mass of the relatively thin tank wall, that the temperatures at the outer surface of the wall 1 and within the socket 5 are substantially identical with the temperature of the milk. Any temperature difference is on the safety side as the indicated temperature will then be somewhat higher than the actual temperature of the milk, whereby the milk will certainly have a temperature of less than 50° F. so long as the indicated temperature is less than 50° F.

The thermometer stem 7 has a snug fit within the socket 5 of Fig. 1 and therefore the bimetallic helix 8, which is of relatively short axial length and positioned within the inner end of the socket, assumes the temperature of the socket. A somewhat quicker response of the thermometer reading to changes in the temperature of the wall 1 may be had by cutting away the top portion of a tubular socket 18, see Figs. 2 and 3, to seat the thermometer stem against the wall 1. It is to be noted that the temperature gradient along the relatively long portion of the stem 7 in advance of the bimetallic helix 8, and along the staff 9, does not affect the accuracy of the reading since it is only the bimetallic helix which actuates the pointer 13, and the helix is at the inner end of that portion of the stem 7 which is parallel to and closely adjacent to or in contact with the bottom wall of the inner tank 1.

There is of course wide latitude in the design and construction of the socket or mechanically equivalent device for thermally coupling the inner end of the bimetallic thermometer to the lower surface of the inner tank wall 1.

As shown in Figs. 4 and 5, a spring metal strip 19 has an end 20 welded to the tank wall 1 and a forward, downwardly turned flange 21 which cooperates with the adjacent rounded surface of the wall 1 to constitute a guide for directing the end of a thermometer stem between the spring strip and the wall 1.

The thermometer stem may be readily pressed through loose insulating material located between the outer wall 2 and the thermometer socket 5 or a spring metal strip 19. In the event that a solid block of insulating material is located between the wall 2 and the adjacent lower surface of the inner wall 1, a passage for the thermometer stem may be cut through the solid insulating material by an auger inserted through the opening or threaded bore of the bushing 15.

It will be apparent that the invention is not limited to the constructions herein illustrated and described, and that various modifications fall within the spirit and scope of the invention as set forth in the following claims.

I claim:

1. The combination with a double-walled tank for the storage of a liquid, the inner liquid-receiving tank having a bottom wall and the outer tank wall being provided with an opening in substantially horizontal alinement with said bottom wall; of means for indicating the temperature of the liquid within the tank; said means comprising a bimetallic thermometer having a helical bimetallic element of short axial length within the inner end of an elongated hollow stem, a staff secured to the bimetallic element for angular adjustment thereby, a mounting head and casing secured to said hollow stem, a graduated scale plate within said casing, a pointer on said staff and movable thereby over the scale plate, cooperating means on said mounting head and on said outer tank at said opening removably supporting said bimetallic thermometer in fixed position on said outer tank wall and extending through said opening with the thermometer stem beneath said bottom wall of the inner tank, and guide means welded to the lower surface of said bottom wall of the inner tank in position to receive the inner end of said thermometer stem and support the same in metallic heat transfer relation to and parallel to the lower surface of said bottom wall of the inner tank, thereby to subject the bimetallic element within said inner end of the thermometer stem to substantially the temperature of the bottom wall of said inner tank.

2. The invention as recited in claim 1, wherein said guide means comprises a socket with a flaring outer end for guiding the inner end of the stem into the same, and said inner end of the thermometer stem which surrounds the bimetallic element is seated within the inner end of said socket.

3. The invention as recited in claim 2, wherein said socket is a tube welded to the inner wall.

4. The invention as recited in claim 3, wherein said tube is cut away along its upper portion to seat said inner end of the thermometer stem in contact with the outer surface of said inner wall.

5. The invention as recited in claim 1, wherein said guide means comprises spring means for yieldingly holding said inner end of a thermometer stem in contact with said inner wall of the tank.

6. The invention as recited in claim 1, wherein said tank includes means supporting the inner wall thereof for limited vertical movement of the inner wall with respect to the outer wall, and the stem and staff of said thermometer are transversely flexible, whereby said temperature-indicating means is not rendered inoperative upon small relative movements of said tank walls.

ANTHONY H. LAMB.

References Cited in the file of this patent

UNITED STATES PATENTS

| Number | Name | Date |
| --- | --- | --- |
| 1,123,556 | Krovetz | Jan. 5, 1915 |
| 1,294,165 | Reese | Feb. 11, 1919 |
| 1,429,975 | Roth et al. | Sept. 26, 1922 |
| 1,667,027 | Boyce | Apr. 24, 1928 |
| 2,112,038 | McLenegan | Mar. 22, 1938 |
| 2,129,803 | Wassell | Sept. 13, 1938 |

FOREIGN PATENTS

| Number | Country | Date |
| --- | --- | --- |
| 158,177 | Switzerland | Nov. 15, 1932 |
| 414,318 | Great Britain | Aug. 2, 1934 |